(12) United States Patent
Iwano et al.

(10) Patent No.: US 10,981,500 B2
(45) Date of Patent: Apr. 20, 2021

(54) IN-CABIN LIGHTING DEVICE

(71) Applicant: Toyota Jidosha Kabushiki Kaisha, Toyota (JP)

(72) Inventors: Yoshihiro Iwano, Toyota (JP); Masaki Ito, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 16/663,904

(22) Filed: Oct. 25, 2019

(65) Prior Publication Data
US 2020/0130575 A1 Apr. 30, 2020

(30) Foreign Application Priority Data
Oct. 31, 2018 (JP) .............................. JP2018-205672

(51) Int. Cl.
*B60Q 3/85* (2017.01)
*H05B 47/175* (2020.01)
*F21S 10/02* (2006.01)

(52) U.S. Cl.
CPC .............. *B60Q 3/85* (2017.02); *H05B 47/175* (2020.01); *F21S 10/02* (2013.01)

(58) Field of Classification Search
CPC .......... B60Q 3/85; H05B 47/175; F21S 10/02

USPC ................................................... 362/459, 488
See application file for complete search history.

(56) References Cited

U.S. PATENT DOCUMENTS

2015/0274089 A1* 10/2015 Schutz ................. H04N 5/2252
224/567
2016/0104486 A1* 4/2016 Penilla ................. G10L 15/005
704/232
2017/0050561 A1* 2/2017 Lickfelt ............... H04N 5/2256

FOREIGN PATENT DOCUMENTS

JP 2008-260391 A 10/2008
JP 2009-113747 A 5/2009
JP 2015-221655 12/2015

* cited by examiner

*Primary Examiner* — Rajarshi Chakraborty
*Assistant Examiner* — Hana S Featherly
(74) *Attorney, Agent, or Firm* — Dinsmore & Shohl LLP

(57) ABSTRACT

An in-cabin lighting device has: a lighting section that emits light within a vehicle cabin, and that is configured to arbitrarily change a color of emitted light; a color detecting portion that detects a color of an detection target in a detection region that is set within the vehicle cabin; and a control section that changes the color of light emitted by the lighting section to the color detected by the color detecting portion.

6 Claims, 3 Drawing Sheets

IN-CABIN LIGHTING DEVICE

CROSS-REFERENCE TO RELATED APPLICATION

This application is based on and claims priority under 35 USC 119 from Japanese Patent Application No. 2018-205672 filed on Oct. 31, 2018, the disclosure of which is incorporated by reference herein.

BACKGROUND

Technical Field

The present disclosure relates to an in-cabin lighting device.

Related Art

The in-cabin lighting device that is disclosed in Japanese Patent Application Laid-Open (JP-A) No. 2015-221655 has: a light-emitting portion that is provided within a vehicle cabin and at which the color temperature and brightness of the emitted light can be regulated; clock means for acquiring time information; and control means for acquiring the current time from the clock means and controlling the light-emitting portion such that a color temperature and brightness, which are set in correspondence with the period of time of the day, are obtained. Due thereto, by automatically controlling the color temperature and the brightness of the lighting within the vehicle cabin by using the period of time of the day, an illuminated color and brightness that suit the biological rhythm of the vehicle occupant are provided. Further, the in-cabin lighting device has a manual regulating means for the color temperature and the brightness of the emitted light to be regulated by operation of a user. The control means controls the light-emitting portion such that the color temperature and brightness of the emitted light, which have been regulated by the manual regulating means, are obtained. Due thereto, the lighting can be adjusted in accordance with the mood and the tastes of the vehicle occupant.

However, in the above-described related art, the color temperature and the brightness of the emitted light are merely adjusted. Therefore, there is room for improvement from the standpoint of enabling the vehicle occupant to effectively produce on their own an in-cabin atmosphere that corresponds to their mood and/or tastes.

SUMMARY

In view of the above-described circumstances, an object of the present disclosure is to provide an in-cabin lighting device that enables a vehicle occupant to effectively produce, on their own, an in-cabin atmosphere in accordance with the mood and the tastes of the vehicle occupant.

An in-cabin lighting device of a first aspect of the present disclosure includes: a lighting section that emits light within a vehicle cabin, and that is configured to arbitrarily change a color of emitted light; a color detecting portion that detects a color of an detection target in a detection region that is set within the vehicle cabin; and a control section that changes the color of light emitted by the lighting section to the color detected by the color detecting portion.

In accordance with the first aspect, the lighting section (e.g., a room lamp, foot lamps, the lamp of a meter panel, and the like) that emits light within a vehicle cabin is configured to arbitrarily change the color of the emitted light. Further, the color detecting portion detects the color of an detection target, within a detection region that is set within the vehicle cabin. The control section changes the color of the light emitted by the lighting section to the color detected by the color detecting portion. Therefore, a vehicle occupant who is riding in the vehicle places an detection target that is of a color corresponding to his/her mood or tastes (e.g., clothes or a sample that are of a color that the vehicle occupant likes) in the detection region, and the color of the detection target is detected by the color detecting portion. Due thereto, the lighting within the vehicle cabin can be changed to the color of the detection target. Therefore, the vehicle occupant can, on their own, effectively produce the atmosphere within the vehicle cabin.

In an in-cabin lighting device of a second aspect of the present disclosure, in the first aspect, the color detecting portion is disposed at a center console that is positioned between a driver's seat and a front passenger's seat within the vehicle cabin.

In the second aspect, the color detecting portion is disposed at the center console that is positioned between the driver's seat and the front passenger's seat. Therefore, it is easy for not only the driver, but also the passengers of the front passenger's seat and the rear seat, to reach the color detecting portion. Due thereto, all of the vehicle occupants can enjoy changing the color of the in-cabin lighting.

In an in-cabin lighting device of a third aspect of the present disclosure, in the first aspect, the color detecting portion is disposed at an interior location within the vehicle cabin, and a cover, which can be set in a state of covering the color detecting portion and in a state of exposing the color detecting portion, is provided at the interior location.

Because the cover is provided at the interior location at which the color detecting portion is disposed, the color detecting portion can be covered by the cover at usual times.

In an in-cabin lighting device of a fourth aspect of the present disclosure, in the first aspect, the color detecting portion has a switch, the color detecting portion detecting the color of the detection target in a case in which the detection target is pressed against the switch.

In the fourth aspect, at the time when a vehicle occupant is to make the color of the detection target be detected by the color detecting portion, it suffices for the vehicle occupant to press the detection target, which is placed in the detection region of the color detecting portion, against the switch that the color detecting portion has. Therefore, the operation for detecting color is easy.

As described above, in accordance with the in-cabin lighting device relating to the present disclosure, a vehicle occupant can, on their own, effectively produce an in-cabin atmosphere in accordance with the mood and the tastes of the vehicle occupant.

BRIEF DESCRIPTION OF THE DRAWINGS

Exemplary embodiments of the present disclosure will be described in detail based on the following figures, wherein.

DETAILED DESCRIPTION

An in-cabin lighting device 10 relating to an embodiment of the present disclosure is described hereinafter by using FIG. 1 through FIG. 4. Note that arrow FR, arrow LH and arrow UP that are shown appropriately in the respective drawings indicate the forward direction (advancing direction), the leftward direction and the upward direction of a vehicle, respectively. Hereinafter, when description is given by merely using longitudinal, left-right and vertical directions, they refer to the longitudinal of the vehicle longitudinal direction, the left and the right of the vehicle left-right direction (the vehicle transverse direction) and the vertical of the vehicle vertical direction, unless otherwise specified.

(Structure)

Figure 1:
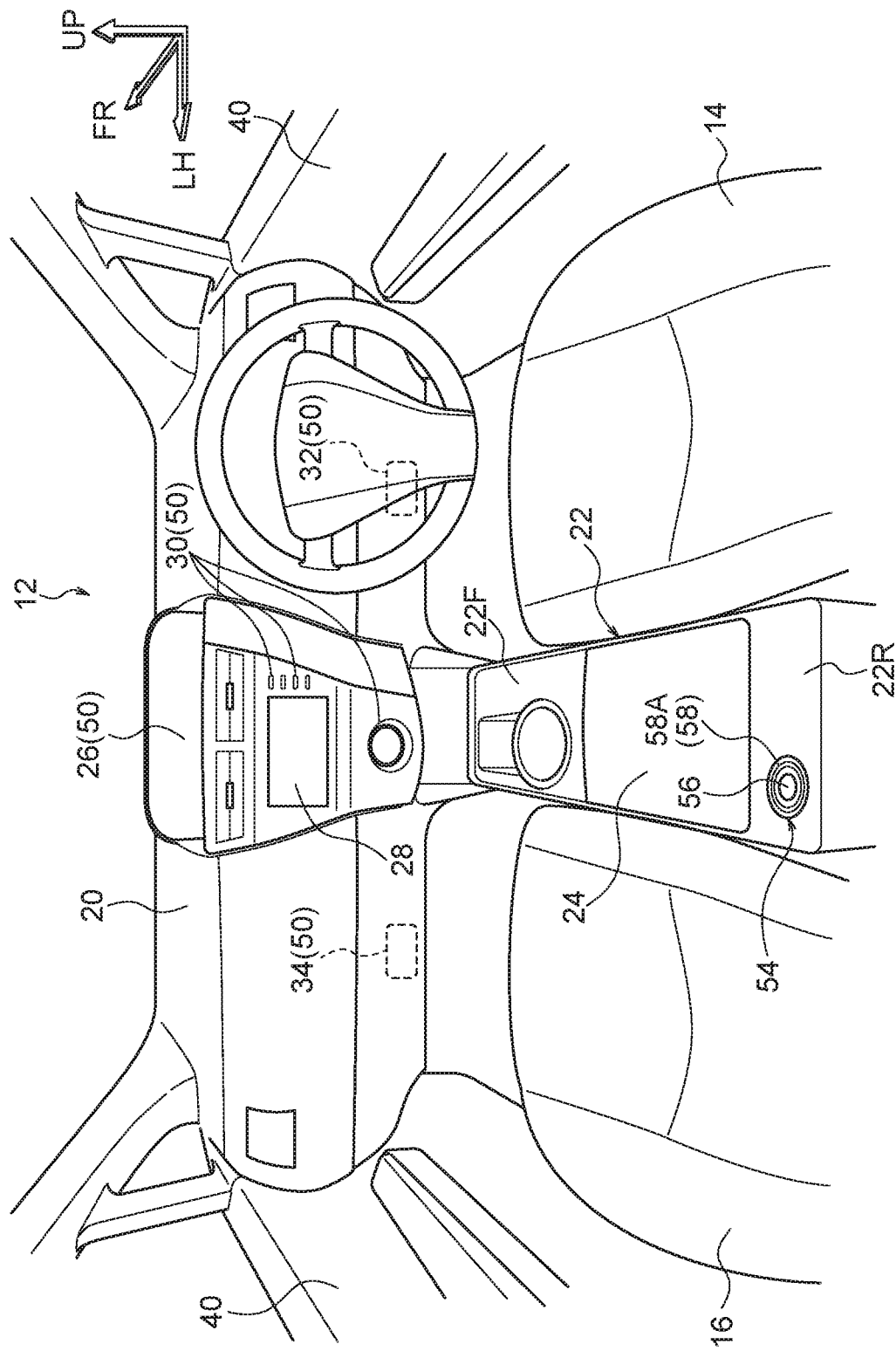
FIG. 1 is a perspective view in which a vehicle cabin interior of a vehicle, to which an in-cabin lighting device relating to an embodiment of the present disclosure is applied, is seen from a vehicle rear side.
Figure 2:
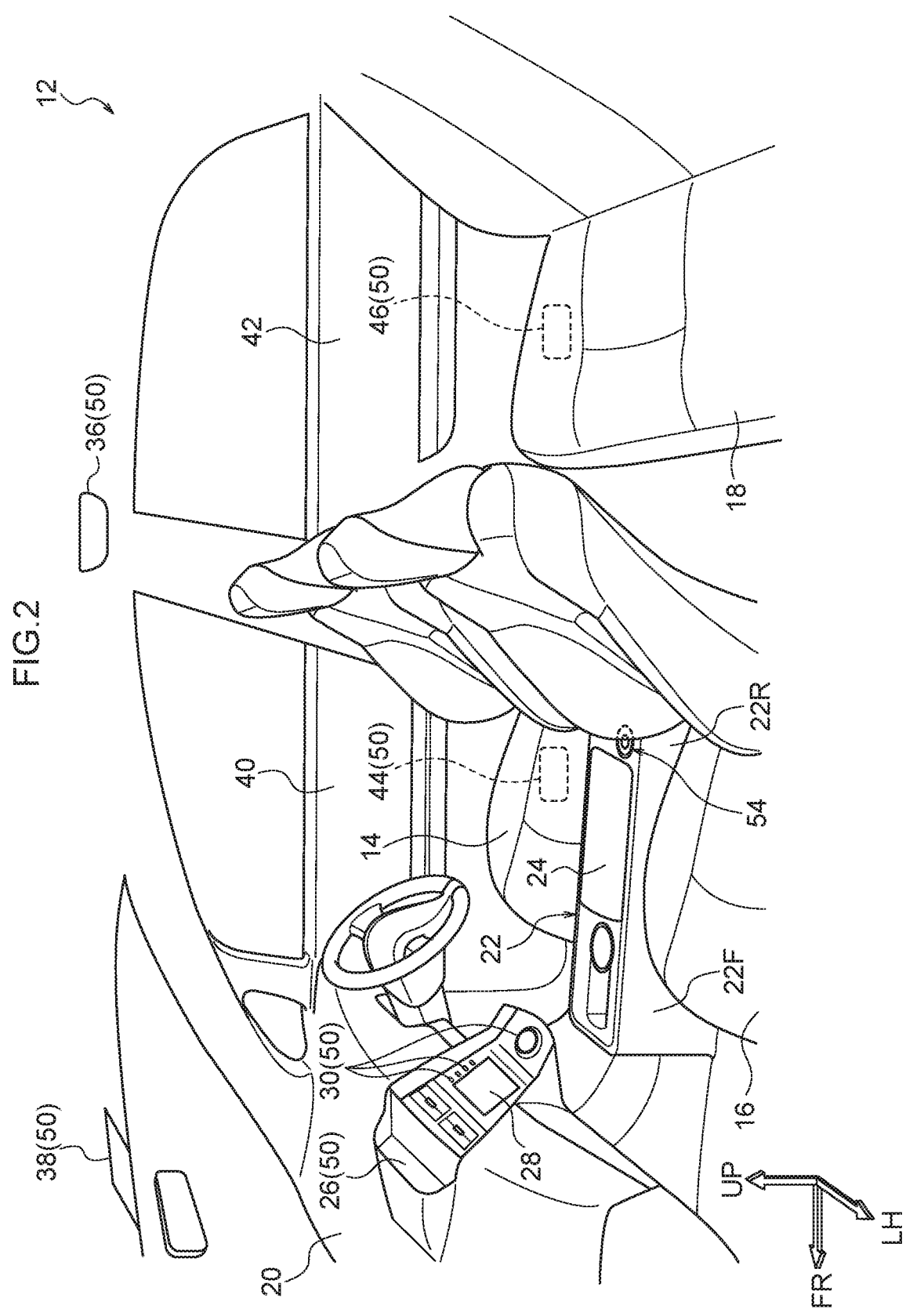
FIG. 2 is a perspective view in which a vehicle cabin front portion of the vehicle is seen from a vehicle left side.
Figure 3:
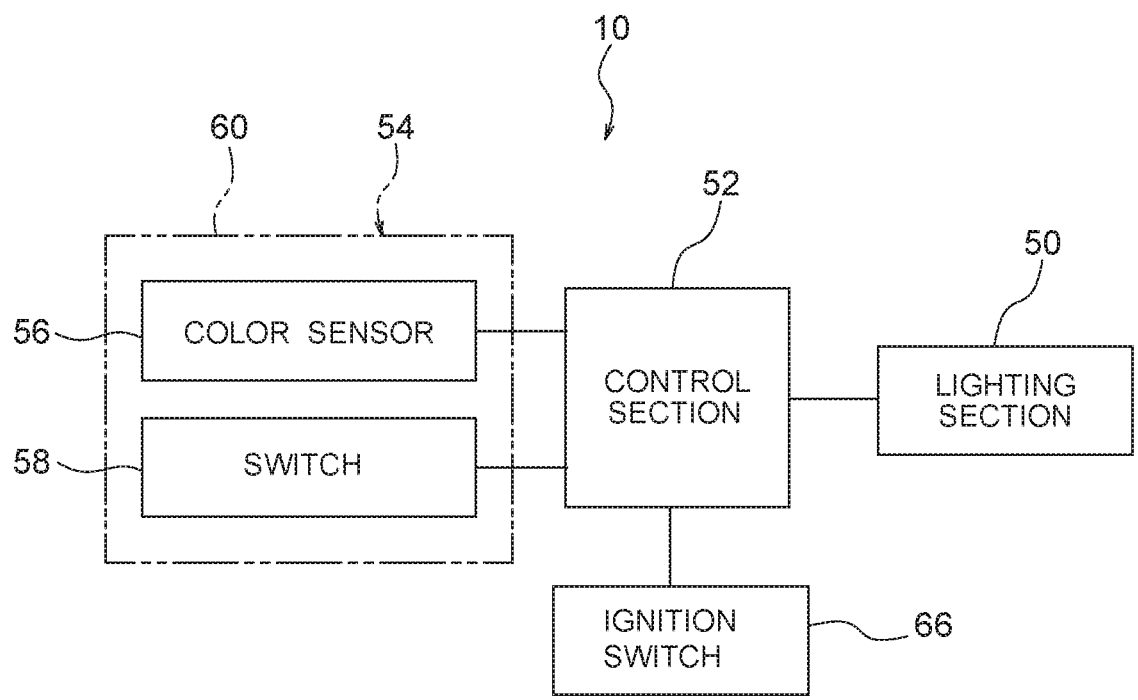
FIG. 3 is a block drawing showing the structure of the in-cabin lighting device.
Figure 4:
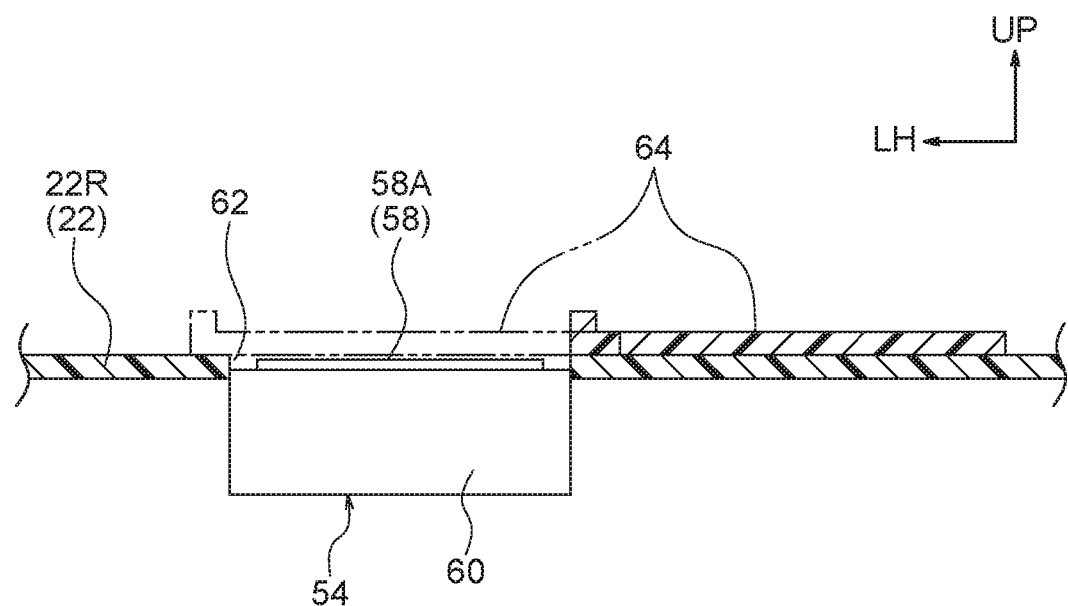
FIG. 4 is a cross-sectional view showing an example of a cover that is provided at a center console.

As shown in FIG. 1 and FIG. 2, a driver's seat 14, a front passenger's seat 16 and a rear seat 18 are disposed within the cabin of a vehicle 12 to which the in-cabin lighting device 10 relating to the present embodiment (see FIG. 3) is applied. An instrument panel 20 is disposed in front of the driver's seat 14 and the front passenger's seat 16. A center console 22 is disposed between the driver's seat 14 and the front passenger's seat 16. A console box 24 is provided at the rear portion of the center console 22. The front end portion of the center console 22 is integrally connected to the left-right direction central portion of the instrument panel 20. A meter panel 26, a car navigation device 28, various types of switches 30, and the like are disposed at the left-right direction central portion of the instrument panel 20.

Unillustrated lamps (light-emitting portions) are provided respectively at the meter panel 26 and the various switches 30. Right and left foot lamps 32, 34 (see FIG. 1), which illuminate the regions of the feet of the vehicle occupants of the driver's seat 14 and the front passenger's seat 16, are provided at the lower portion of the instrument panel 20. Further, as shown in FIG. 2, a room lamp 36 is provided at the central portion of the roof of the vehicle 12, and an overhead lamp 38 is provided at the front end portion of the roof. Door lamps 44, 46 are provided respectively at front side doors 40 and rear side doors 42 of the vehicle 12.

The above-described respective lamps is configured to arbitrarily (freely) change the color of the light emitted within the vehicle cabin. Concretely, each of the above-described respective lamps has red, green and blue light sources (e.g., LED elements), and a control circuit that controls the driving currents of these light sources. So-called full-color display is made possible by the mixing ratio of the aforementioned three primary colors of light. For example, the brightnesses of the aforementioned red, green and blue light sources can respectively be regulated to 256 levels. Light of 16,777,216 colors can be emitted by combinations thereof (256×256×256). These lamps structure a lighting section 50 (see FIG. 3) of the in-cabin lighting device 10. Note that the lighting section 50 may include lamps other than those described above (e.g., a tube lamp for illumination that is disposed at the instrument panel 20 or the like, foot lamps for illuminating the regions at the feet of the passengers in the rear seat 18, and the like). The lighting section 50 is electrically connected to a control section 52 (shown only in FIG. 3) of the in-cabin lighting device 10.

The control section 52 has, for example, a CPU (Central Processing Unit), a RAM (Random Access Memory), a ROM (Read Only Memory), and an input/output interface section that carries out communication with external devices, and is structured such that these are connected to one another via a bus. Note that the control section 52 may be structured from plural electronic control units, and may be realized by either hardware or software. A color detecting portion 54 of the in-cabin lighting device 10 is electrically connected to the control section 52.

The color detecting portion 54 is disposed at a rear end portion 22R of the center console 22, at the vehicle rear side of the console box 24. This color detecting portion 54 has a color sensor 56, a switch 58 and a case 60 (reference numeral 60 is shown only in FIG. 3 and FIG. 4). The case 60 here is formed in the shape of a cylinder whose axial direction is the vehicle vertical direction. The case 60 is mounted to the rear end portion 22R of the center console 22 in a state in which the top surface thereof is exposed to the vehicle cabin interior from an opening portion 62 (reference numeral shown only in FIG. 4) that is formed in the top surface of the rear end portion 22R of the center console 22.

A plate-shaped cover 64 (refer to FIG. 4 because not illustrated in FIG. 1 and FIG. 2) is slidably mounted to the rear end portion 22R of the center console 22. The cover 64 can be slid between a state of covering the case 60 (i.e., the color detecting portion 54) (refer to the cover 64 that is shown by the two-dot chain line in FIG. 4) and a state of exposing the case 60 to the vehicle cabin interior (refer to the cover 64 shown by the solid line in FIG. 5). Note that the cover 64 may be mounted so as to be able to rotate with respect to the center console 22 (interior location).

The color sensor 56 is provided at the central portion of the top surface of the case 60. The color sensor 56 is structured so as to detect the color of an detection target (i.e., an object subject to detection) by, for example, illuminating respective lights from the red, green and blue LED elements onto the detection target, and photometrically measuring the proportion of and the light amounts of the respective lights reflected from the detection target by light-receiving elements such as phototransistors or the like. The detection region of the color sensor 56 is made to be a range of, for example, several centimeters upward from the top surface of the color sensor 56.

The switch 58 has a ring-shaped push button 58A that is accommodated within the case 60 and is disposed coaxially with the periphery of the color sensor 56. This push button 58A projects-out slightly upwardly from the top surface of the case 60, and is structured so as to be operated by being pressed downward. The push button 58A can be pressed and operated due to a vehicle occupant of the vehicle 12 pressing an detection target (clothes or a sample that are of a color that the vehicle occupant likes), which is disposed in the aforementioned detection region (above the color sensor 56), against the push button 58A. When the push button 58A is pressed and operated, the switch 58 turns on. Note that the above-described shapes of the case 60 and the push button 58A are merely examples, and can be changed appropriately.

When the switch 58 turns on, the control section 52 outputs an operation signal to the color sensor 56. Due thereto, the LED elements that are provided at the color sensor 56 emit light, and the results of detection of the light-receiving elements of the color sensor 56 are inputted to the control section 52. Therefore, when an detection target that is disposed in the detection region of the color sensor 56 is pressed against the push button 58A as described above, the light-receiving elements of the color sensor 56 detect the color of the detection target, and the results of detection are outputted to the control section 52. The control section 52, to which the results of detection of the color sensor 56 are outputted, outputs a control signal to the lighting section 50, and changes the color of the light emitted from the lighting section 50 to a color corresponding to the aforementioned results of detection.

The ignition switch 66 of the vehicle 12 is electrically connected to the control section 52. In a case in which the ignition switch 66 is turned off, the color that the lighting section 50 emits is reset to a standard color (e.g., white). Note that, for example, a reset switch may be disposed at the instrument panel 20 or the center console 22 or the like, and the aforementioned resetting may be carried out by operation of this reset switch.

Operation and Effects

Operation and effects of the present embodiment are described next.

In the in-cabin lighting device 10 of the above-described structure, the lighting section 50 (the room lamp 36, the foot lamps 32, 34, the lamps of the meter panel 26, and the like), which emits light within the vehicle cabin, is configured to arbitrarily change the color of the emitted light. Further, the color sensor 56 of the color detecting portion 54 detects the color of an detection target in a detection range that is set within the vehicle cabin. Then, the control section 52 changes the color of the light that the lighting section 50 emits to the color detected by the color sensor 56. Therefore, a vehicle occupant who is riding in the vehicle 12 places an detection target that is of a color corresponding to his/her mood or tastes (e.g., clothes or a sample that are of a color that the vehicle occupant likes) in the detection region, and the color of the detection target is detected by the color sensor 56. Due thereto, the lighting within the vehicle cabin can be changed to the color of the detection target. Therefore, the vehicle occupant can, on his/her own, effectively produce the atmosphere within the vehicle cabin. A vehicle occupant can match the atmosphere within the vehicle cabin to his/her mood or tastes, such as, for example, in-cabin staging that matches the vehicle occupant's clothes is possible, or the like.

Moreover, in the present embodiment, because the color detecting portion 54 is disposed at the center console 22 that is positioned between the driver's seat 14 and the front passenger's seat 16, it is easy for not only the driver, but also the passengers of the front passenger's seat and the rear seat 18, to reach the color detecting portion 54. Due thereto, all of the vehicle occupants can enjoy changing the color of the in-cabin lighting.

In the present embodiment, the cover 64, which can be set in a state of covering the color detecting portion 54 and in a state of exposing the color detecting portion 54, is provided at the center console 22 (interior location) at which the color detecting portion 54 is disposed. Due thereto, because the color detecting portion 54 can be covered by the cover 64 at usual times, the color detecting portion 54 can be protected from, for example, beverages that vehicle occupants spill on the center console 22, and the like.

Moreover, in the present embodiment, the color detecting portion 54 has the switch 58 against which the detection target, which is located in the aforementioned detection region (above the color sensor 56), is pressed, and, by this pressing, the color detecting portion 54 detects the color of the detection target. Therefore, at the time when a vehicle occupant is to have the color of the detection target be detected by the color detecting portion 54, it suffices for the vehicle occupant to press the detection target, which is placed in the detection region of the color detecting portion 54, against the switch 58 that the color detecting portion 54 has, and therefore, the operation for detecting color is easy.

Note that the above-described embodiment is structured such that the switch 58 is provided at the case 60 of the color detecting portion 54. However, the present disclosure is not limited to this, and may be structured such that the switch 58 is provided so as to be apart from the case 60 of the color detecting portion 54.

Further, although the above-described embodiment is structured such that the color detecting portion 54 is disposed at the rear end portion 22R of the center console 22 that is an interior location, the present disclosure is not limited to this, and may be structured such that the color detecting portion 54 is disposed at a front portion 22F side (see FIG. 1 and FIG. 2) of the center console 22. Or, the present disclosure may be structured such that the color detecting portion 54 is disposed at an interior location other than the center console 22, such as at the instrument panel 20, the door trim of the front side door 40, or the like.

Further, the above-described embodiment is structured such that the cover 64 is provided at the rear end portion 22R of the center console 22, at the vehicle rear side of the console box 24. However, the present disclosure is not limited to this. For example, the cover 64 may be omitted in a case in which the color detecting portion 54 is disposed within the console box 24.

In addition, the present disclosure can be embodied by being changed in various ways within a scope that does not depart from the gist thereof. Further, the scope of the right of the present disclosure is, of course, not to be limited to the above-described embodiment.

What is claimed is:

1. An in-cabin lighting device comprising:
a lighting section that emits light within a vehicle cabin, and that is configured to arbitrarily change a color of emitted light;
a color detecting portion that includes a switch and a sensor that detects a color of a detection target in a detection region that is set within the vehicle cabin in a case in which the detection target is pressed against the switch; and
a control section that changes the color of light emitted by the lighting section to the color detected by the color detecting portion.

2. The in-cabin lighting device of claim 1, wherein the color detecting portion is disposed at a center console that is positioned between a driver's seat and a front passenger's seat within the vehicle cabin.

3. The in-cabin lighting device of claim 2, wherein the color detecting portion is disposed at a rear end portion of the center console, at a vehicle rear side of a console box that is provided at a rear portion of the center console.

4. The in-cabin lighting device of claim 1, wherein:
the color detecting portion is disposed at an interior location within the vehicle cabin, and a cover, which can be set in a state of covering the color detecting portion and in a state of exposing the color detecting portion, is provided at the interior location.

5. The in-cabin lighting device of claim 4, wherein the cover is slidably mounted to the interior location.

6. The in-cabin lighting device of claim 1, wherein an ignition switch is electrically connected to the control section, and in a case in which the ignition switch is turned off, the control section causes the lighting section to emit light of a standard color.

* * * * *